W. BEACH.
WHEEL FOR VEHICLES.
No. 19,478.  Patented Mar. 2, 1858.
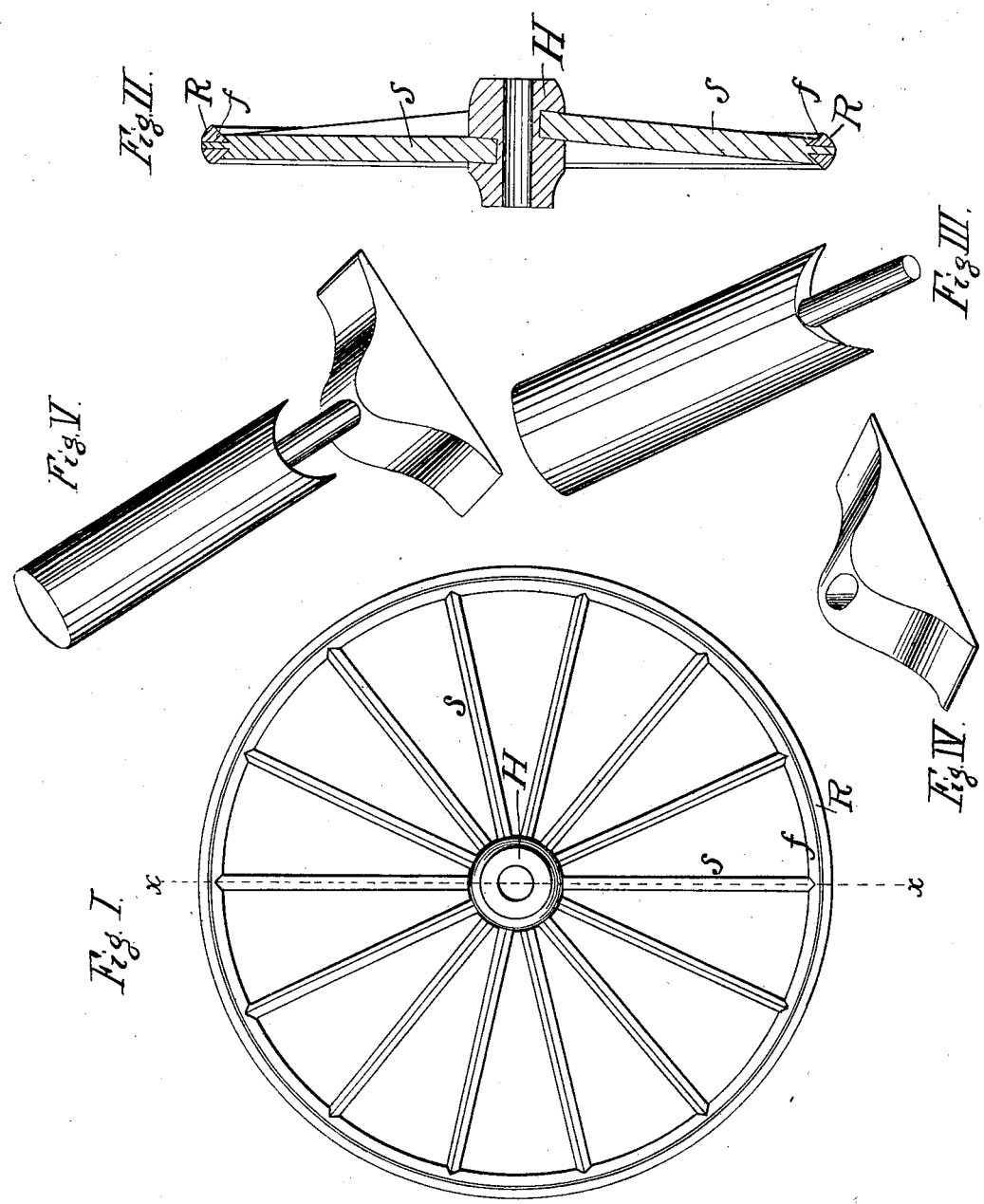

UNITED STATES PATENT OFFICE.

WALDREN BEACH, OF BALTIMORE, MARYLAND.

METALLIC CARRIAGE-WHEEL.

Specification of Letters Patent No. 19,478, dated March 2, 1858.

*To all whom it may concern:*

Be it known that I, WALDREN BEACH, of the city of Baltimore and the State of Maryland, have invented a new and useful improvement in the manufacture of carriage-wheels for all kinds of wheel-vehicles, which combines great strength, durability, utility, lightness, and cheapness in manufacturing, which improvement in the mode of manufacture enables me to have the entire wheels made up mostly by machinery and finished at the ordinary foundries and rolling-mills of the country, thereby much diminishing the usual cost of such articles and enabling me to supply the most extensive demand for a strong, durable, and economical part of vehicles at reduced prices and of such durability that they may be used over and over again after the usual wagon-bodies and running-gear connections have become useless.

It is a well known fact, that in military campaigns, where the wagons are much exposed to the alternate effects of rain and sun; and to the cannon shot of an enemy; the ordinary wooden wheels, with iron tires, are very objectionable. The effects of the sun and rain upon them is to cause them to split, shrink, and come to pieces; while the cannon shot causes the splinters from the wheels to do great damage to the troops in attendance, upon the wagons or gun-carriages, as the case may be.

It is to obviate and remedy these difficulties that I have contrived the present improvement, and to prevent the loss consequent thereon, after a campaign. With my wagons, the wheels would be almost as valuable after the campaign, as they were before it; and even if they were sold as old iron they would realize within a very few cents per pound of their original cost. As the wheels now in use for such purposes do not possess these great advantages, it must be admitted that the improvement is an important one.

My improvement relates to that class of wheels, in which the hub is cast upon the spokes; and consists in so modifying and arranging, and shaping, the several parts, that I am enabled to make a most excellent wheel with but three essential parts; viz. the hub, the spokes, and the tire. The ordinary felly is dispensed with; and yet, the strength and beauty of the wheel is preserved; its cost diminished and its durability much increased.

The following is the description of my invention, which will enable others skilled in the art to make and use it; reference being had to the drawing, which forms part of this my specification.

Figure (1) is a side view of the wheel. Fig. (2) is a section of the wheel, showing the spokes as arranged in the hub and in the rim or tire. Fig. (3) is a spoke, showing the peculiar formation of its end, where it is inserted and riveted into the rim or tire. Fig. (4) is an end view of the rim or tire iron, before it is welded or put together. Fig. (5) is a perspective view of the spoke and rim, when the same are about being united together.

It will be seen that the principle of the T iron is adopted in forming the rim, or tire, of the wheel; to give the greatest strength possible, in the same amount of material. The spokes are also so arranged as to brace and strengthen the rim. While the peculiar shape given to the ends thereof, where they are united to the rim, tends to give strength and beauty of finish to the joint with the least amount of material.

The mode of construction is as follows: The tire or rim iron is first rolled out in the required form, as above described. It is then cut in proper lengths, and perforated, at proper intervals, for the reception of the ends of the spokes; and then formed into a hoop and welded; when we have the rim. The spokes, having been made in the required form, are then riveted in the rim; care being taken that they shall alternately incline in opposite directions, so that when the hub is cast upon the opposite ends, they will brace the rim; so as to resist pressure in the most effectual manner. The rim and spokes are then placed so that the hub can be cast around the inner end of the spokes, in the usual manner; and properly finished.

Having thus described my invention, and the mode of construction thereof, I wish to state, that I am aware that there is nothing new and patentable in casting the hub of a wheel on the spokes after they are in place. Nor is it new to give the T form of iron to the fellies of wheels, for the purpose of giving strength to them; nor it is new to make the tire of a wheel with a projection of the metal on the inner side, and along the middle thereof; but, in these cases, the tire was put over the fellies, or the rim, of the wheel; and was not so formed and combined with the spokes, as to obviate the necessity of using the fellies. I therefore do not claim to be the first inventor of any one of these features, nor ask a patent therefor; but, What I do claim as my invention, and for which I ask Letters Patent, is—

The combination and arrangement of the several parts, as above described, whereby I have made a strong, light, durable, and cheap metallic wheel, which consists of but three essential parts; while I have preserved all the important qualities of a good carriage wheel, in the highest degree.

In testimony whereof, I have hereunto signed my name before two subscribing witnesses.

WALDREN BEACH.

Witnesses:
GEO. PATTEN,
J. D. MURPHY.